March 21, 1961   A. H. VONDER ESCH   2,975,590
PROPORTIONAL COOLANT FLOW THRUST CHAMBER
Filed Dec. 2, 1957   3 Sheets-Sheet 1
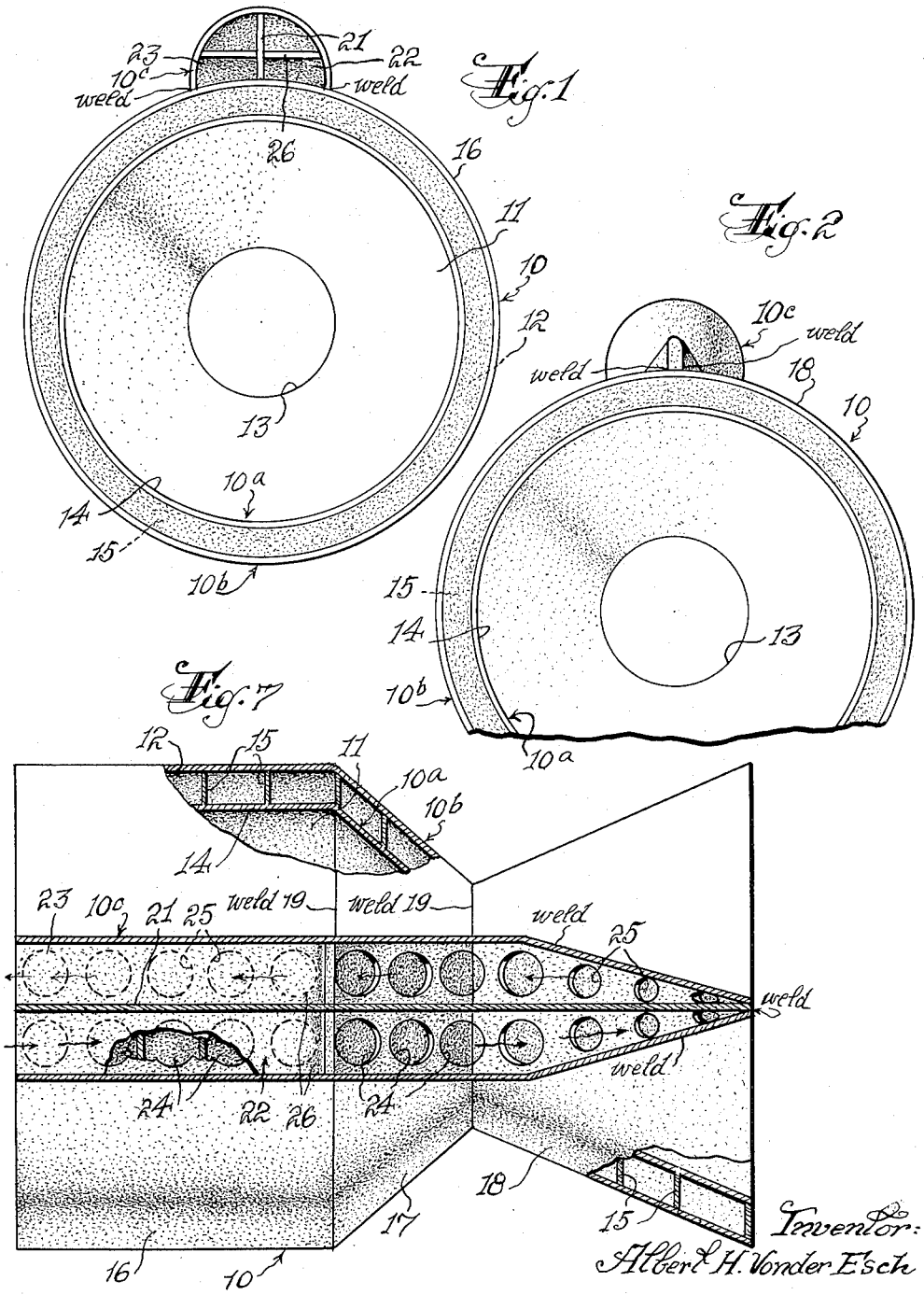

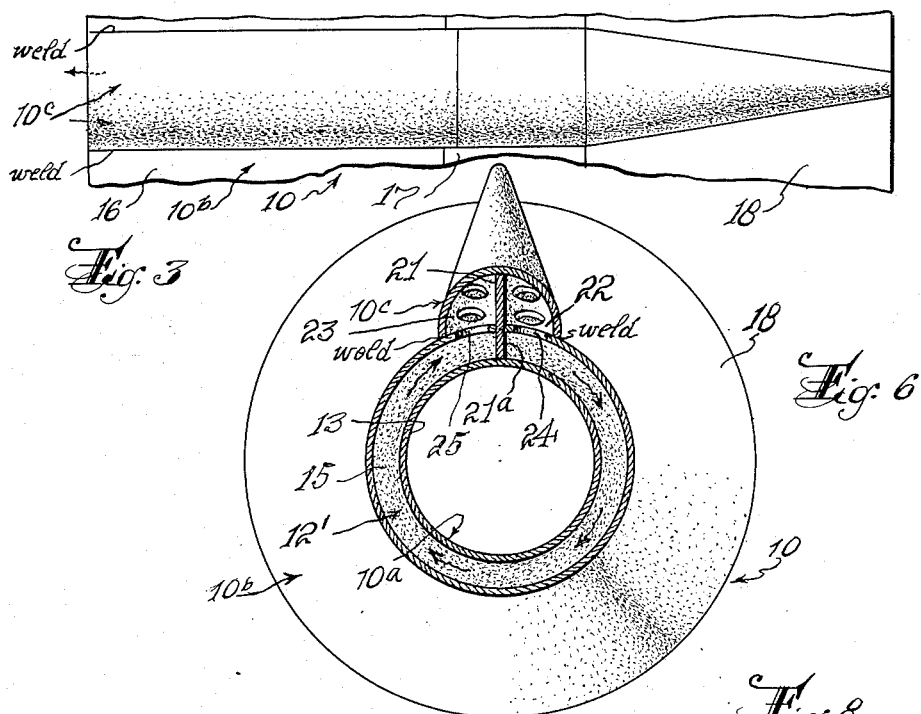
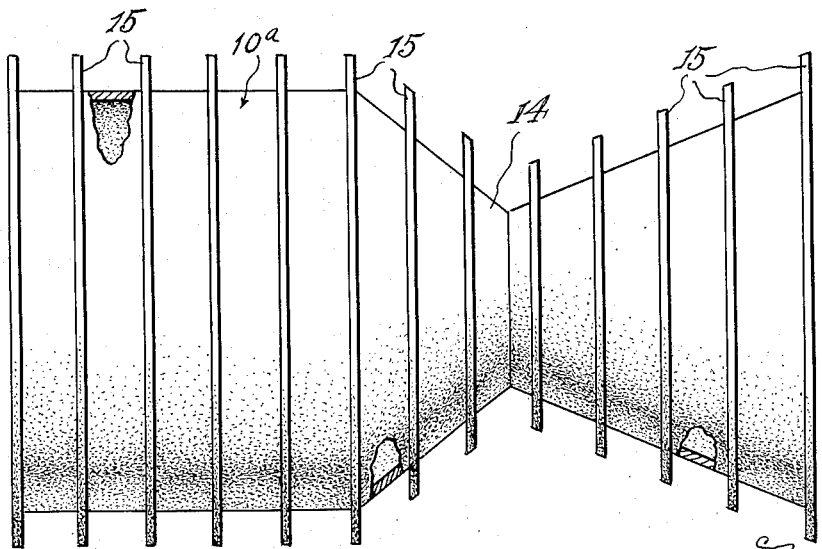

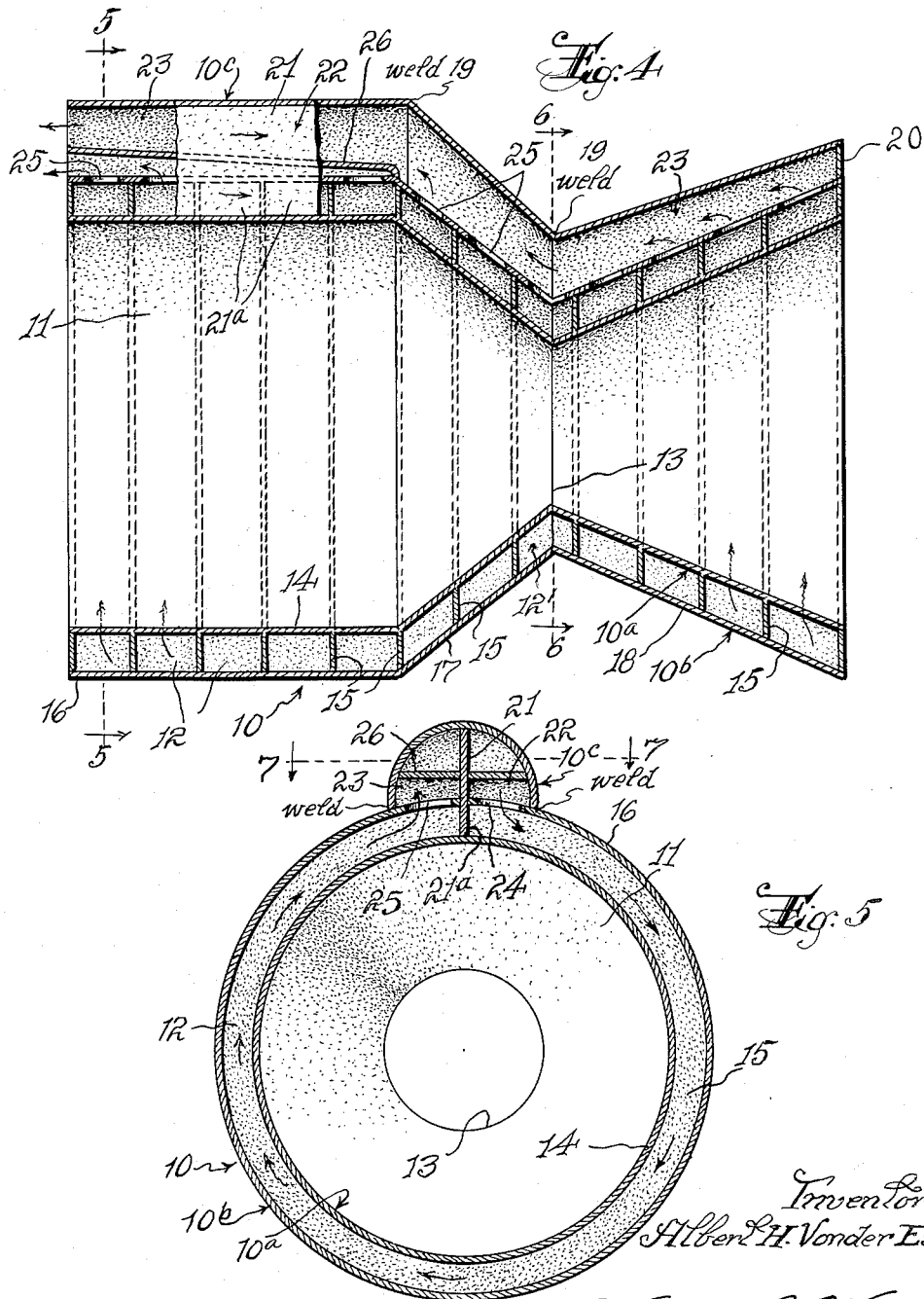

United States Patent Office 2,975,590
Patented Mar. 21, 1961

2,975,590
PROPORTIONAL COOLANT FLOW THRUST CHAMBER

Albert H. Vonder Esch, Flanders, N.J., assignor, by mesne assignments, to Thiokol Chemical Corporation, a corporation of Delaware Filed Dec. 2, 1957, Ser. No. 699,971
2 Claims. (Cl. 60—35.6)

The invention relates in general to rocket thrust chambers and has particular reference to those which burn liquid propellants and are provided with wall cooling means.

At the outset, it may be well to define the term "rocket thrust chamber" as used herein. The term is intended to embrace the complete assembly consisting of the propellant injector, the usually cylindrical combustion chamber, and the nozzle with its convergent-divergent throat. A typical rocket thrust chamber within this definition is represented conventionally in the following diagram.

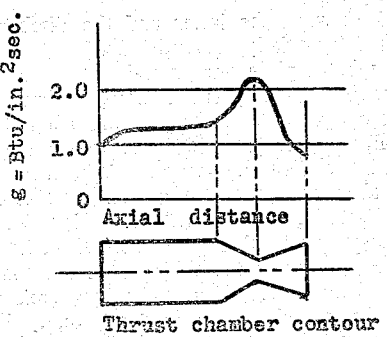

Thrust chamber contour

It is well known that the heat transfer density $g$ varies considerably along the rocket thrust chamber axis as plotted in the above graph. In the critical region of the nozzle throat, heat transfer by convection from the combustion gases to the chamber wall is at its greatest rate.

It therefore is the primary object of my present invention to construct the rocket thrust chamber in such a manner that the coolant flow is programmed to the critical areas of heat transfer.

To be specific, I have devised an improved rocket thrust chamber of the type mentioned in which the coolant passageways are circumferentially extending and separate from each other. To this coolant passageway structure is added an axially extending manifold for the coolant fluid and means incorporated therein to distribute the said fluid while at its initial low temperature in proper proportions directly to the respective combustion chamber and critical nozzle throat areas in such a manner that the critical area will receive a greater volume of the coolant fluid without its having been heated previously in any other heat transfer area.

Another object of the invention is to provide a rocket thrust chamber structure possessing the improved features just enumerated which is extremely light in weight and allows the use of simple fabrication procedures.

Further objects, advantages and features will become apparent as the following specific description is read in connection with the accompanying drawings, in which:

Fig. 1 is a front elevation of the device with the propellants injector removed; Fig. 2 is a rear elevation; Fig. 3 is a plan view partially broken away; Fig. 4 is a longitudinally vertical section; Fig. 5 is a transverse section on line 5—5 of Fig. 4; Fig. 6 is a similar view on line 6—6 of Fig. 4; Fig. 7 is a fragmentary horizontal section on line 7—7 of Fig. 5; and Fig. 8 is a detail side elevational view of the inner shell component alone prior to final assembly with the outer shell and manifold components.

Referring now in detail to the drawings, wherein like reference characters designate corresponding parts in the several views, it will be observed that the coolant passageways of the improved rocket thrust chamber structure 10 are circumferentially extending and uniformly spaced from end to end of the device. Coextensive with combustion chamber 11 there is a first section of passageways 12 of equal diameter and downstream of said first section there is a critical second section of passageways 12' that follows the contour of the convergent-divergent nozzle throat 13.

The passageway-forming thrust chamber structure 10 includes two separately fabricated components 10a and 10b (of which the former alone is shown individually in Fig. 8), which are assembled to produce the completed fluid-cooled chamber disclosed in Figs. 1 to 6, inclusive.

Referring particularly to Fig. 8, component 10a includes an inner liner, or shell 14, of conventional thrust chamber contour that has external circumferential stiffening ribs 15 formed integral therewith. The ribbed inner shell 14 preferably is produced by extrusion and rolling procedures. An important advantage of the integral shell and rib construction, in addition to structural stiffness, is improvement in the heat transfer path by conduction therethrough. The other component 10b is an outer shell which may be fabricated by rolling the contour-conforming chamber, convergent nozzle and divergent nozzle parts 16, 17 and 18, respectively, before assembly of the same into a unitary structure (Fig. 4). After being assembled in enclosing relation to component 10a, these parts 16, 17 and 18 of component 10b are united by suitable joint means 19, such as welds. Outer shell 10b serves as the primary structural member to restrain the internal combustion pressure. The assembled structure results in the formation of the separate circumferential coolant passageway sections 12 and 12'.

An axially extending manifold component 10c thereafter is assembled with previously united components 10a—10b. This manifold component 10c is longitudinally sinuous in form to match the thrust chamber contour and is in the nature of a channel of C-shaped cross-section having its side edges united to outer shell 10b of thrust chamber structure 10 by suitable means, as by welded joints.

The upstream end of manifold 10c is open to form a combination inlet and outlet, whereas the downstream end is closed by an end wall 20. A longitudinal baffle plate 21, which lies in the plane of the thrust chamber axis, divides manifold 10c into respective delivery and discharge channels 22 and 23 for the coolant flow entering and leaving the manifold, respectively. Consequently, the upstream end of delivery channel 22 constitutes an inlet and the upstream end of discharge channel 23 is an outlet. These respective inlet and outlet openings are adapted to be connected in any desired practical manner to delivery and discharge conduits of a source of coolant fluid supply (not shown).

Baffle plate 21 is represented as having an inward extension 21a that is countersunk in outer shell 10b and ribs 15 (Figs. 5 and 6) to render each coolant passageway 12—12' semi-annular in extent. In cooperation with this feature, outer shell 10b is provided with respective delivery and discharge orifices 24 and 25 that establish communication between delivery and discharge channels 22 and 23 of manifold 10c and the respective otherwise closed ends of all coolant passageways 12—12'.

The effect of delivery and discharge channels 22 and 23 of manifold 10c and the corresponding delivery and discharge orifices 24 and 25 in outer shell 10b of thrust chamber 10 is to circulate coolant fluid through the passageway sections 12 or 12', as the case may be, for the desired cooling of the combustion chamber or critical nozzle throat areas (see arrows).

My primary object of distributing coolant flow proportionally to the respective areas of the thrust chamber is achieved by use of a flow divider partition 26 which extends longitudinally in the portion of manifold 10c that is coextensive with combustion chamber 11. This partition 26 is substantially tangential to thrust chamber 10 and completely intersects delivery and discharge channels 22 and 23. It also is inclined downstream and united at its downstream end in an impervious joint with a rib 15 of inner thrust chamber component 10a at the plane of juncture of combustion chamber 11 with the convergent portion of nozzle throat 13.

The effect of divider partition 26 is to deliver part of the incoming coolant flow directly into the first section coolant passageways 12 and to bypass this section with a greater volume of the flow, which is delivered directly at its initial temperature to the second section passageways 12' in the critical region surrounding nozzle throat 13.

In the operational use of my device, coolant fluid is admitted at initial temperature to right-hand delivery channel 22 (Fig. 5) at the upstream inlet end of manifold 10c. The flow is divided by horizontal partition 26 so that part of the flow goes underneath said partition no further than the first section passageways 12 which surround combustion chamber 11. This part of the flow branches off and enters passageways 12 through delivery orifices 24, whence the flow passes clockwise approximately 360 degrees around combustion chamber 11 and enters left-hand discharge channel 23 through orifices 25. The heated fluid moves forward through discharge channel 23 and reenters the coolant supply system (not shown) through the outlet end of said channel. An even greater proportion of the coolant fluid goes over the top of partition 26, bypasses the first section passageways 12, and still at its initial comparatively cool temperature flows from right-hand delivery channel 22 through orifices 24 into the second section passageways 12' surrounding the critical nozzle throat 13 of thrust chamber 10. After passing approximately 360 degrees in passageways 12', the flow passes through discharge orifices 25 into left-hand discharge channel 23 and thence to the outlet. In this way, the hottest part of thrust chamber 10, i.e. the critical nozzle throat region, is supplied with the greater proportion of the coolant flow and at substantially initial temperature because the coolant passageways of the combustion chamber region have been bypassed.

While there have been shown and described and pointed out the fundamental novel features of this invention as applied to only one structural embodiment, it will be understood that various omissions and substitutions and changes in the form and details of the device illustrated and its operation may be made by those skilled in the art without departing from the spirit of the invention. It is the intention, therefore, to be limited only as indicated by the scope of the following claims.

I claim:

1. A proportional coolant flow thrust chamber of conventional design having a cylindrical combustion chamber and a convergent-divergent nozzle throat, said thrust chamber comprising: an inner shell; plural axially spaced circumferential stiffening ribs provided on the external periphery of said inner shell; an outer shell surrounding said inner shell and ribs to form annular coolant passageways therebetween; an axially extending manifold coextensive with said outer shell and marginally united thereto with its downstream end closed and its upstream end open to provide a combination inlet and outlet; a baffle plate extending lengthwise in the manifold and lying in the plane of the thrust chamber axis to divide said manifold into lengthwise delivery and discharge channels for coolant fluid, the outer shell being provided with orifices located on opposite sides of said manifold baffle plate to establish communication between the delivery channel and the respective coolant passageways and between the latter and the discharge channel; and a substantially tangential divider partition intersecting the baffle plate and extending between the sides of the manifold, said partition being inclined inwardly downstream and united in impervious manner to a rib substantially at the plane of juncture of the combustion chamber and nozzle sections of the thrust chamber to direct a proportion of the coolant flow directly into the coolant passageways of the combustion chamber section and to bypass another proportion of the flow directly to the passageways of the critical nozzle throat section.

2. The invention defined in claim 1, wherein the baffle plate of the manifold is extended radially inward in countersunk relation to the outer shell and ribs to divide the coolant passageways into semi-annular portions on opposite sides of said plate.

References Cited in the file of this patent

UNITED STATES PATENTS

| | | |
|---|---|---|
| 2,159,913 | Tenney | May 23, 1939 |
| 2,445,661 | Constant et al. | July 20, 1948 |
| 2,496,710 | Goddard | Feb. 7, 1950 |
| 2,658,332 | Nicholson | Nov. 10, 1953 |
| 2,900,168 | Nyborg | Aug. 18, 1959 |